US012600058B2

(12) United States Patent
Zhang et al.

(10) Patent No.: US 12,600,058 B2
(45) Date of Patent: Apr. 14, 2026

(54) CARBONIZED BRICK OF RECYCLED CONCRETE POWDERS AND PREPARATION METHOD THEREOF

(71) Applicants: SHANDONG UNIVERSITY, Jinan (CN); Shandong High-Speed Group Co., Ltd., Jinan (CN)

(72) Inventors: Hongzhi Zhang, Jinan (CN); Zhijie Li, Jinan (CN); Yingxuan Shao, Jinan (CN); Yifeng Ling, Jinan (CN); Zhiqiang Liu, Jinan (CN); Chen Chen, Jinan (CN); Zhi Ge, Jinan (CN); Renjuan Sun, Jinan (CN); Yanhua Guan, Jinan (CN)

(73) Assignees: SHANDONG UNIVERSITY, Jinan (CN); Shandong High-Speed Group Co., Ltd., Jinan (CN)

( * ) Notice: Subject to any disclaimer, the term of this patent is extended or adjusted under 35 U.S.C. 154(b) by 317 days.

(21) Appl. No.: 18/358,356

(22) Filed: Jul. 25, 2023

(65) Prior Publication Data

US 2023/0364824 A1 Nov. 16, 2023

Related U.S. Application Data

(63) Continuation of application No. PCT/CN2023/074768, filed on Feb. 7, 2023.

(30) Foreign Application Priority Data

May 6, 2022 (CN) ........................ 202210487338.9

(51) Int. Cl.
*C04B 18/08* (2006.01)
*B28B 1/14* (2006.01)
(Continued)

(52) U.S. Cl.
CPC ............ *B28B 1/14* (2013.01); *B28B 17/0081* (2013.01); *C04B 7/147* (2013.01); *C04B 11/262* (2013.01);
(Continued)

(58) Field of Classification Search
CPC ..... B28B 1/14; B28B 17/0081; C04B 11/262; C04B 22/106; C04B 18/08; C04B 28/082; C04B 28/142; C04B 2111/00198
See application file for complete search history.

(56) References Cited

U.S. PATENT DOCUMENTS 11,623,160 B2 * 4/2023 Jenner .................. A63H 33/086
52/606
12,037,786 B2 * 7/2024 Frederico .................. E04B 2/18
(Continued)

FOREIGN PATENT DOCUMENTS

SU 90843 A1 11/1950

*Primary Examiner* — Silvana C Runyan
(74) *Attorney, Agent, or Firm* — Pilloff Passino & Cosenza LLP; Rachel Pilloff; Sean Passino

(57) ABSTRACT

A carbonized brick of recycled concrete powders and a preparation method thereof are provided, belonging to the field of concrete materials. The preparation method includes: adding composition A to a liquid storage tank; introducing composition B into the liquid storage tank to react with a solid waste solution to generate calcium bicarbonate solution; filling recycled powders into a molding die, decomposing the calcium bicarbonate solution by heat, reacting generated carbon dioxide with calcium ions leached from a C—S—H gel in the recycled powders to produce calcium carbonate, and precipitating, crystallizing and cementing in the molding die together with calcium carbonate produced by decomposing calcium bicarbonate solution, and resulting in strength of the recycled powders.

8 Claims, 2 Drawing Sheets

(51) Int. Cl.

| | |
|---|---|
| ***B28B 17/00*** | (2006.01) |
| ***C04B 7/147*** | (2006.01) |
| ***C04B 11/26*** | (2006.01) |
| ***C04B 22/10*** | (2006.01) |
| ***C04B 28/08*** | (2006.01) |
| ***C04B 28/14*** | (2006.01) |
| *C04B 111/00* | (2006.01) |

(52) U.S. Cl.

CPC ............ *C04B 18/08* (2013.01); *C04B 22/106* (2013.01); *C04B 28/082* (2013.01); *C04B 28/142* (2013.01); *C04B 2111/00198* (2013.01)

(56) References Cited

U.S. PATENT DOCUMENTS

2016/0194874 A1* 7/2016 Radford .................... E04B 7/22
29/897.34
2022/0002197 A1* 1/2022 Imbabi ................ C04B 40/0039

* cited by examiner

CARBONIZED BRICK OF RECYCLED CONCRETE POWDERS AND PREPARATION METHOD THEREOF

CROSS-REFERENCE TO RELATED APPLICATIONS

This application is a continuation of PCT/CN2023/074768, filed on Feb. 7, 2023 and claims priority to Chinese Patent Application No. 202210487338.9, filed on May 6, 2022, the entire contents of which are incorporated herein by reference.

TECHNICAL FIELD

The present application relates to a carbonized brick of recycled concrete powders and a preparation method thereof, belonging to the technical field of construction materials.

BACKGROUND

China is facing a rapid pace of urbanization, which inevitably involves the demolition, renovation and reconstruction of existing buildings, and the amount of waste concrete generated increases as the number of building construction projects keeps growing. At present, the waste concrete is scientifically and technically processed, mainly crushed into coarse and fine aggregates for manufacturing recycled concrete, mortar and other materials, which are used in projects of buildings, roads and bridges with mechanical properties equal to those of ordinary concrete. However, the research regarding the recycling of recycled powders of certain fineness produced by waste concrete after step-by-step crushing and grinding is insufficient, and direct discarding will cause waste of resources; moreover, the powder is prone to floating in the air due to its small particle size (generally defined as <0.16 millimeter), causing air pollution and endangering people's health. Therefore, it is important to improve the utilization efficiency of waste concrete recycled powders to reduce secondary environmental pollution and resource waste.

At present, the increasing concentration of carbon dioxide in the air worldwide is causing serious climate change. To achieve the goal of "carbon neutrality" and effectively mitigate global warming, it is necessary to realize carbon dioxide capture and storage safely, effectively and economically while vigorously developing and applying new energy sources. Traditional manufacturing process of sintered bricks, including manual drying and roasting, emits a high total amount of air pollutants. Internationally, standards for air pollutant emissions in the brick and tile industry are increasingly strict as air pollution prevention and control are becoming a major factor limiting the sustainable, high-quality development of the brick and tile industry. In view of that, the carbonized brick is developed; it is a non-sintered brick in which calcium hydroxide is carbonized in a carbon dioxide rich environment to produce calcium carbonate, thus obtaining strength. Industrial waste and waste gas are effectively recycled by being used as materials to prepare carbonized bricks, an environmental-friendly product with high strength, yet requiring no process of calcination. Nonetheless, available preparation methods for carbonated bricks usually employs carbonized maintenance technology, which involves slow diffusion of carbon dioxide into the concrete matrix and low carbon dioxide storage rate, resulting in insufficient recycling of waste resources and prolonged production.

SUMMARY

In response to the shortcomings of the existing technology, the present application provides a carbonized brick of recycled concrete powders and a preparation method thereof, where industrial solid waste is used as a calcium source, and carbonate ions produced by dissolving industrial waste gas containing carbon dioxide in water are reacted with calcium ions leached form industrial solid waste to prepare a calcium bicarbonate solution based on the principle of liquid phase carbonation technology, and then fed into a molding die containing recycled powders to prepare a carbonized brick with a high storage rate of carbon dioxide, and the resulting carbonized brick is economic and environmental friendly, with high productivity and no need of calcination and pressing.

The present application adopts following technical schemes:

a preparation method of a carbonized brick of recycled concrete powders, including following steps:

(1) weighing a composition A with a certain mass, adding the composition A into a liquid storage tank with deionized water as a source of calcium ions, where the composition A includes industrial solid waste materials;

(2) introducing one or more gases of a composition B into the liquid storage tank, controlling a gas flow rate to be 0.30-0.60 liter per minute (L/min), preferably 0.30 L/min, starting a stirring device configured with a stirring rod, where a stirring speed is 700-1,000 revolutions per minute (r/min), preferably 700 r/min; reacting with a solid waste solution to obtain a calcium bicarbonate solution, keeping a temperature of the liquid storage tank at 4-8 degrees Celsius (° C.), preferably 4° C.; temporarily stopping introducing gases when a pH value in the liquid storage tank is reduced to 6.0-6.3 and kept constant, then replacing a new A in the liquid storage tank; among them, the composition B is a source of hydrogen carbonate, including air or industrial waste gas containing carbon dioxide;

(3) weighing a component of recycled powders, and filling into a molding die, connecting the molding die with the liquid storage tank through a pipeline, where the pipeline is configured with a water pump used for pumping the calcium bicarbonate solution from the liquid storage tank circularly into the molding die with a solution flowing rate of 1.0 meter per second (m/s)-3.0 m/s;

controlling a temperature of the molding die to be 45-55° C., preferably 50° C., heating to decompose the calcium bicarbonate solution to generate carbon dioxide, allowing the carbon dioxide generated to react with calcium ions leached by C—S—H gel in the recycled powders to produce calcium carbonate, followed by precipitating, crystallizing and cementing the recycled powders in the molding die together with the calcium carbonate produced by decomposing the calcium bicarbonate solution to develop strength;

(4) turning off the water pump and stopping pumping the calcium bicarbonate solution when a pressure at an inflow of the solution into the molding die reaches 1.5-3 megapascal (MPa), preferably 1.5 MPa, where the recycled powders in the molding die are cemented and strength is developed;

it is judged from experiments that a final compressive strength of the carbonized brick is about 15 MPa, i.e., it is proposed that when the compressive strength is 1/10 to 1/5 of the compressive strength of the carbonized brick, the calcite has cemented the recycled powders and formed a mesh structure to develop strength, and an amount of calcium bicarbonate solution fed is adequate, and a feeding of the solution is capable of being stopped at this time; and (5) after stopping feeding calcium bicarbonate solution, waiting for about 30 min to remove the molding die with no further curing, leaving to dry under natural conditions before putting into use. As the recycled powders and calcite particles are all closely packed, there is a solid mechanical occlusion between calcite particles, which enables the component C in the molding die to be quickly glued together without pressing and molding.

According to the preparation method of the carbonized brick of recycled concrete powders as illustrated above, it takes about 3-5 hours (h) to mineralizing and storing carbon dioxide from the solid waste materials of the composition A until the carbonized brick is formed and put into use, effectively saving production schedules.

The principle of the present application is as follows:

the principle of carbonation reaction involves a process of physical adsorption and diffusion, which is divided into four stages based on the gas-liquid-solid phase reaction theory, including: firstly, at room temperature and pressure, the calcium-based reactive material in industrial solid waste dissolves and hydrolyzes in aqueous medium, releasing hydroxide ions, causing the pH of the slurry to rise and the slurry obtains strong alkalinity and strong ability to capture and storage carbon dioxide; carbon dioxide dissolves in water to produce carbonic acid, which reacts rapidly with hydroxide ions and calcium ions in the slurry, resulting in the decreasing of pH in the slurry and generation of calcium carbonate precipitation, the calcium ions are highly soluble and favorable for calcite formation at 4 degrees Celsius; after that, the producing speed of hydroxide ions by hydrolysis of solid waste materials is basically equal to that of hydrogen ions ionized by bicarbonate, and the pH of slurry remains relatively stable; as the mineralization reaction continues, the producing speed of hydroxide ions by hydrolysis is gradually dropped below the producing speed of hydrogen ions by introducing carbon dioxide, and the pH of slurry gradually decreases to remain unchanged when the carbonation reaction is basically completed; in the process, an appropriate flowing rate ensures that the calcium bicarbonate solution fed into the molding die is fully decomposed by heat and undergoes subsequent precipitation and crystallization reactions, while too fast a flowing rate may cause part of the calcium bicarbonate solution to flow out of the molding die before decomposition or precipitation occurs, resulting in lower conversion efficiency, and too slow a flowing rate may cause prolonged production and lowers the efficiency of carbonized brick preparation.

With an excess introduction of carbon dioxide, the slurry becomes weakly acidic and calcium carbonate precipitates gradually decompose into calcium bicarbonate, according to following reactions:

$$CaO + H_2O = Ca(OH)_2$$

$$Ca(OH)_2 = Ca^{2+} + 2OH^-$$

$$CO_2 + H_2O \rightleftharpoons H_2CO_3$$

$$H_2CO_3 \rightleftharpoons H^+ + HCO_3^-$$

$$CO_2 + OH^- \rightleftharpoons HCO_3^-$$

$$HCO_3^- \rightleftharpoons CO_3^{2-} + H^+$$

$$Ca^{2+} + HCO_3^- = CaCO_3 + H^+$$

$$Ca^{2+} + CO_3^{2-} \xrightarrow{H_2O} CaCO_3$$

$$CaCO_3 + CO_2 + H_2O \rightleftharpoons Ca(HCO_3)_2.$$

The calcium bicarbonate solution decomposes under temperature conditions of about 50° C. in the molding die, producing carbon dioxide and calcium carbonate precipitation. Under conditions of pH=5 to 8, calcium leaches from the unstable C—S—H gel structure in the recycled powders and reacts with the carbon dioxide produced by the decomposition of calcium bicarbonate to produce calcium carbonate precipitation. The precipitated calcium carbonate forms crystals (calcite) under warm and humid conditions. The crystals, mixed with recycled powders, grow and develop in the interstices thus filling the pores, cementing the recycled powders and constructing with each other to form a mesh structure, which eventually forms strength. The granular gradation of the recycled powders is determined based on the principle of compact accumulation, which can effectively improve the denseness of the slurry.

Optionally, the composition A includes any one or more combinations of calcium-containing industrial solid waste materials, including carbide slag, fly ash, steel slag, desulfurized gypsum, granulated blast furnace slag, tailings, coal gangue and the like.

According to percentages of calcium, aluminum, magnesium and other elements in the composition A, a mass percentage of each component is determined, with a calculation formula as follows:

$$y_{Ca} = \frac{xN}{0.045} + 0.516\,(M - x);$$

in the calculation formula, $y_{Ca}$ is a sum of calcium contents of all solid waste materials in the composition A, x is a mass of a solid waste material with a highest calcium content in the composition A, N represents a proportion of calcium in the solid waste material with the highest calcium content in the composition A, xN/0.045 represents a calcium content in the solid waste material with the highest calcium content in the composition A, 0.045 is an empirical coefficient derived from the calcium content of solid waste material with the highest calcium content in the composition A, M is a total mass of all solid waste materials in the composition A, 0.516(M−x) is a sum of calcium contents of other solid waste materials in the composition A, and 0.516 is an empirical coefficient derived from the sum of calcium contents of other solid waste materials in the composition A.

For solid waste materials from different sources, the percentage of each component in the chemical composition varies sometimes greatly and the composition is complex, the empirical coefficient serves as a correction to improve the applicability of the formula to many types of solid waste materials.

The empirical coefficients of 0.045 and 0.516 are obtained by fitting in a software based on data of calcium contents of several groups of solid waste materials, and are representative as they are obtained through analysis of a large amount of data.

After determining the mass of the solid waste material with the highest calcium content in the composition A according to the formula, appropriate contents of silicon and magnesium elements are determined, and the mass of other solid waste materials are determined by an equation as follows:

$$y_{Si} = \frac{xN}{1.95} + Z(M - x)$$

$$y_{Mg} = \frac{xN}{10.14} + E(M - x),$$

in the equation, $y_{Si}$ and $y_{Mg}$ represent contents of silicon and magnesium in all solid waste materials in the composition A, respectively, Z is a proportion of silicon in the solid waste materials determined, E is a proportion of magnesium in the solid waste materials determined, xN/1.95 and xN/10.14 respectively represent contents of silicon and magnesium in the solid waste material with the highest calcium content in the composition A, with 1.95 and 10.14 being empirical coefficients respectively; Z(M−x) and E(M−x) respectively represent contents of silicon and magnesium in other solid waste materials; by adding $y_{Si}$ and $y_{Mg}$, a sum of contents of silicon and magnesium contained in all solid waste materials in the composition A is obtained.

Same as above, the empirical coefficients 1.95 and 10.14 are obtained by fitting in the software based on multiple groups of data on the elemental contents of silicon and magnesium in solid waste materials, which are representative as derived from a large amount of data analysis.

Optionally, main components of the recycled powders include silicon dioxide, calcium hydroxide, calcium aluminosilicate, ettringite and other phases.

Optionally, the C—S—H gel accounts for about 70% of a total volume of the recycled powders after fully hydration, and the calcium hydroxide accounts for about 20% of the total volume.

Optionally, the liquid storage tank is connected with a pH monitor and a temperature controller, where the temperature controller is configured to maintain the liquid storage tank at a stable temperature, and the pH monitor is configured to monitor the liquid storage tank in terms of pH value change so as to control a duration of introducing the carbon dioxide.

Optionally, a liquid inlet main pipe and a liquid outlet main pipe are connected between the liquid storage tank and the molding die, a water pump is configured on the liquid inlet main pipe, and a pipeline pressure monitor is arranged on the liquid inlet main pipe near the molding die;

the molding die is internally configured with a plurality of grids with a size same as that of the carbonized brick prepared, where the size includes 240 millimeters (mm)×115 mm×53 mm, 240 mm×115 mm×180 mm, 180 mm×180 mm×90 mm, the size is determined according to actual needs and is not limited to the three sizes mentioned above. The recycled powders have a particle gradation that satisfies a most compact stacking state, forming a uniform and dense state after filling into the grids, and the recycled powders are not easy to float, so there is no need to prepare the recycled powders into a wet material to be loaded onto the molding die; and a heating pipe is configured around each grid, and each grid is provided with a liquid inlet branch pipe and a liquid outlet branch pipe, a plurality of liquid inlet branch pipes are connected with the liquid inlet main pipe, and a plurality of liquid outlet branch pipes are connected with the liquid outlet main pipe. The water pump pumps the calcium bicarbonate solution circulative into the molding die, and after entering the molding die, the calcium bicarbonate solution flows through each branch pipe and into each grid.

Optionally, the carbonized brick prepared is tested according to GB/T 2452-2012 *Test Methods for Wall Bricks* in terms of compressive strength and water absorption, and on a basis of thermogravimetric test results of the carbonized brick, a carbon capture rate is calculated as a formula as follows:

$$\eta_{co_2} = \frac{\frac{w(CO_2)}{1 - w(CO_2)} \times \frac{M_{Ca}}{M_{CO_2}}}{Q_{Ca}} \times 100\%,$$

in the formula, $w(CO_2)$ is a mass fraction of carbon dioxide in the carbonized brick, $M_{Ca}$ and $M_{CO_2}$ represent molar masses of calcium and carbon dioxide, respectively, and $Q_{Ca}$ is a mass fraction of calcium in industrial solid waste materials before carbonation (solid waste material that has not participated in any reaction before being placed in the liquid storage tank).

The recycled powders conform to a theory of most compact stacking, with minimum inter-particle voids, and the carbonized brick produced is more uniform and denser as a whole. Based on Andreasen's compact stacking theory, the particle gradation is evaluated, and a particle size distribution in the most compact stacking state is:

$$U(D) = 100\left(\frac{D}{D_1}\right)^n,$$

in the formula, U(D) is a volume fraction of particles with a particle size smaller than D, %; D is a particle size, micrometer (μm); $D_1$ is a particle size of a largest particle in a system, μm; n is a distribution index, taking as ⅓.

The particle size distribution of recycled powders under a most compact packing state is shown in Table 2, and the recycled powders are in the most compact packing state when the particle gradation satisfies the following Table 2:

TABLE 2

| Particle gradation of recycled powders in the most compact packing state Andreasen distribution ($D_{max}$ = 31.6 μm) | | | | | | |
|---|---|---|---|---|---|---|
| Particle size/μm | 0-2.4 | 2.4-2.9 | 2.9-4.5 | 4.5-10.1 | 10.1-20.9 | 20.9-31.6 |
| Volume/% | 42.35 | 2.76 | 7.11 | 16.15 | 18.76 | 12.87 |
| Accumulated volume/% | 42.35 | 45.11 | 52.22 | 68.37 | 87.13 | 100 |

The particle gradation of the composition C, i.e., the recycled powders, shall meet the most compact packing state as illustrated in Table 2, with contents of calcium oxide and silicon dioxide being 17.51-29.20 weight percentage (wt %), and 27.80-43.26 wt % respectively. The recycled powders have a chemical composition consisting mainly of calcium oxide and silica, where silica is the most important component for the crystalline phase in the recycled powders. The recycled powders prepared from waste concrete already have hydration products such as calcium hydroxide, calcium silica-aluminate and calcium alumina, which exist mainly in the form of gel. The hydration degree of different waste concrete varies greatly, resulting in large differences in the content of hydration products.

Optionally, the composition A includes calcium carbide slag, fly ash and steel slag, where the calcium carbide slag is 30 parts, the fly ash is 35 parts, and the steel slag is 20 parts by mass;

the liquid storage tank includes 51 parts of water, and a ratio of water in the liquid storage tank to the composition A is water:composition A=0.6; and the composition C includes 30 parts of recycled powders.

Optionally, the composition A includes calcium carbide slag, fly ash and steel slag, where the calcium carbide slag is 33 parts, the fly ash is 30 parts, and the steel slag is 20 parts by mass;

the liquid storage tank includes 51 parts of water, and a ratio of water in the liquid storage tank to the composition A is water:composition A=0.6; and the composition C includes 30 parts of recycled powders.

Optionally, the composition A includes calcium carbide slag, fly ash and desulfurized gypsum, where the calcium carbide slag is 30 parts, the fly ash is 30 parts and the desulfurized gypsum is 25 parts by mass;

the liquid storage tank includes 51 parts of water, and a ratio of water in the liquid storage tank to the composition A is water:composition A=0.6; and the composition C includes 30 parts of recycled powders.

The carbide slag includes: 79.68-84.90 wt % CaO, 1.56-3.28 wt % $SiO_2$, 2.20-2.29 wt % $Al_2O_3$, 0.19-0.73 wt % MgO and 8.80-16.37 wt % others.

The fly ash includes: 3.42-8.45 wt % CaO, 45.71-48.10 wt % $SiO_2$, 23.20-31.34 wt % $Al_2O_3$, 2.47-3.17 wt % $Na_2O$, 0.57-3.97 wt % MgO and 4.97-24.63 wt % others.

The steel slag includes: 40.61-43.15 wt % CaO, 12.12-15.28 wt % $SiO_2$, 4.72-5.31 wt % $Al_2O_3$, 6.95-7.02 wt % $Fe_2O_3$, 10.35-11.62 wt % FeO, 10.34-12.39 wt % MgO, 1.21-2.52 wt % MnO, and 2.71-13.7 wt % others.

A carbonized brick of recycled concrete powders prepared by the above preparation method.

In this application, the calcium source is developed by using industrial solid waste such as calcium carbide slag, fly ash, steel slag, desulfurized gypsum, granulated blast furnace slag, tailings, coal gangue, etc., and the carbonate ions produced by dissolving industrial waste gas containing carbon dioxide in water are reacted with the calcium ions leached from industrial solid waste to make calcium bicarbonate solution with high solubility based on the principle of liquid phase carbonation technology, with effectively increased stored amount and conversion rate of carbon dioxide; after introducing the calcium bicarbonate solution into the molding die containing recycled powders, the calcium bicarbonate is decomposed by heat, the reaction contacting area is enlarged with a fast reaction speed, the carbon dioxide produced is precipitated with calcium carbonate, and the calcium ions precipitated from the waste concrete recycled powders in the molding die also produce calcium carbonate precipitates, the calcium carbonate precipitates are crystallized, polymerized and cemented with the recycled powders in the most compact packing state to produce strength of the product, and finally a carbonized brick of good economy, high production efficiency, no calcination, environmental protection is produced, with the performance in all aspects meeting the requirements of national standards for construction materials, providing a realistic effect to achieve the goal of "carbon emission reduction".

It is worth noting that the present application uses instruments such as temperature controller, pH monitor, pipe pressure monitor, etc., all of which are commercially available models and do not affect the implementation of the present application.

Where the present application is not exhaustive, the prior art is adopted.

The present application has the beneficial effects that:

the present application employs recycled powders derived by crushing and grinding of waste concrete with fly ash, calcium carbide slag and other industrial solid wastes, featuring low raw material cost; the recycled powders with fine particle size are conducive to its micro-aggregate filling effect; the specific surface area and particle fineness of the recycled powders are generally larger than those of commonly used cement, which is conducive to stimulating the activity, and the processing equipment is simple and beneficial to industrial production;

the present application adopts the gradation of recycled powders of the most compact packing state, and the calcium carbonate precipitates and crystallizes to form the compact packed calcite particles, enabling the carbonized brick product to be dense and have a high compressive strength and stable strength;

comparison with the traditional manufacturing process of carbonized brick: existing preparation process of carbonized brick mostly involves putting the molded specimen into carbonization chamber for carbonized maintenance for at least 3 h or even many days after the preparation of brick body, which takes longer production duration, and the process of carbon dioxide gas diffusing into the concrete matrix is slow and the carbon fixation rate is low, resulting in insufficient resource regeneration and low production efficiency; the soluble solid waste material is adopted in this application as the calcium source, and the carbon dioxide gas is fixed and converted into liquid state with high solubility, effectively enhancing the carbon dioxide fixation rate; calcium carbonate crystallizes and cements the recycled powders, which can be put into use immediately after forming and demolding with no need of carbonized maintenance, effectively shortening the production duration; and the present application allows the permanent capture and storage of the greenhouse gas carbon dioxide produced during industrial production, and the preparation process requires no calcination and does not emit any polluting gas, which is beneficial to mitigate the greenhouse effect, realize "carbon reduction" and resource recycling, and protect the environment.

DETAILED DESCRIPTION OF THE EMBODIMENTS

To make the technical problems to be solved, technical schemes and advantages of the present application more clear, the following is a detailed description in conjunction with the accompanying drawings and specific embodiments, which are not limited thereto, and those not exhaustively described in the present invention are in accordance with the conventional techniques in the art.

Embodiment 1

Figure 1:
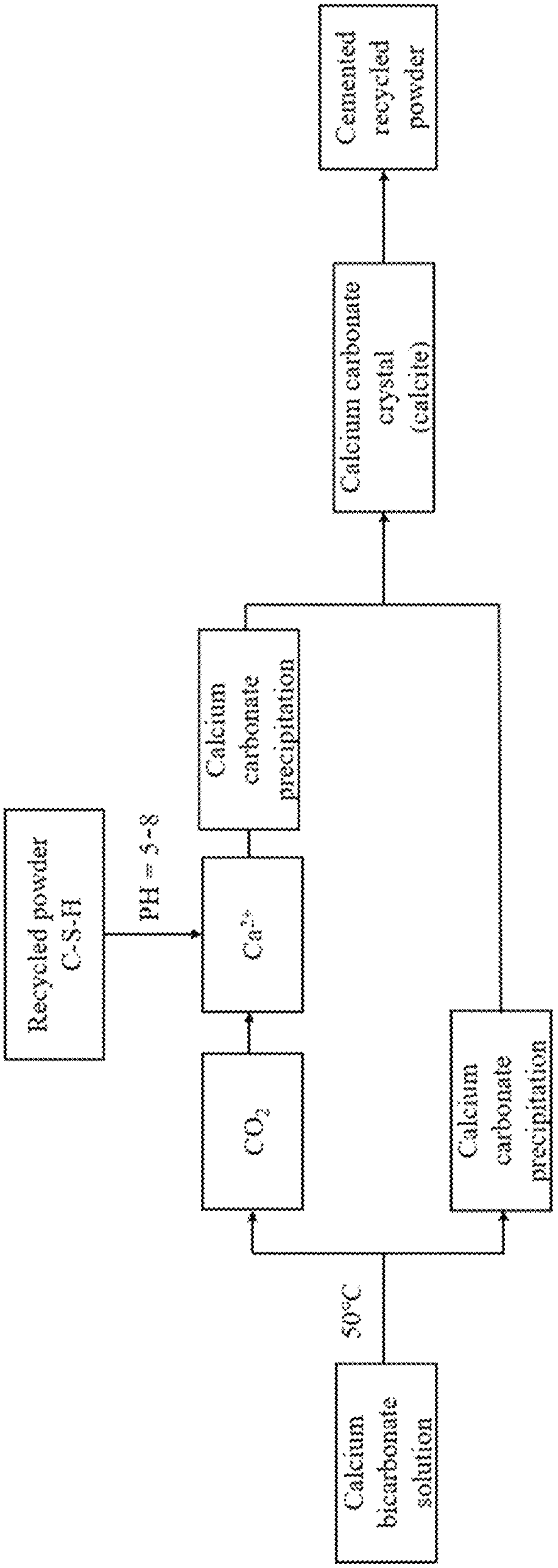
FIG. 1 shows a schematic diagram of the present application.
Figure 2:
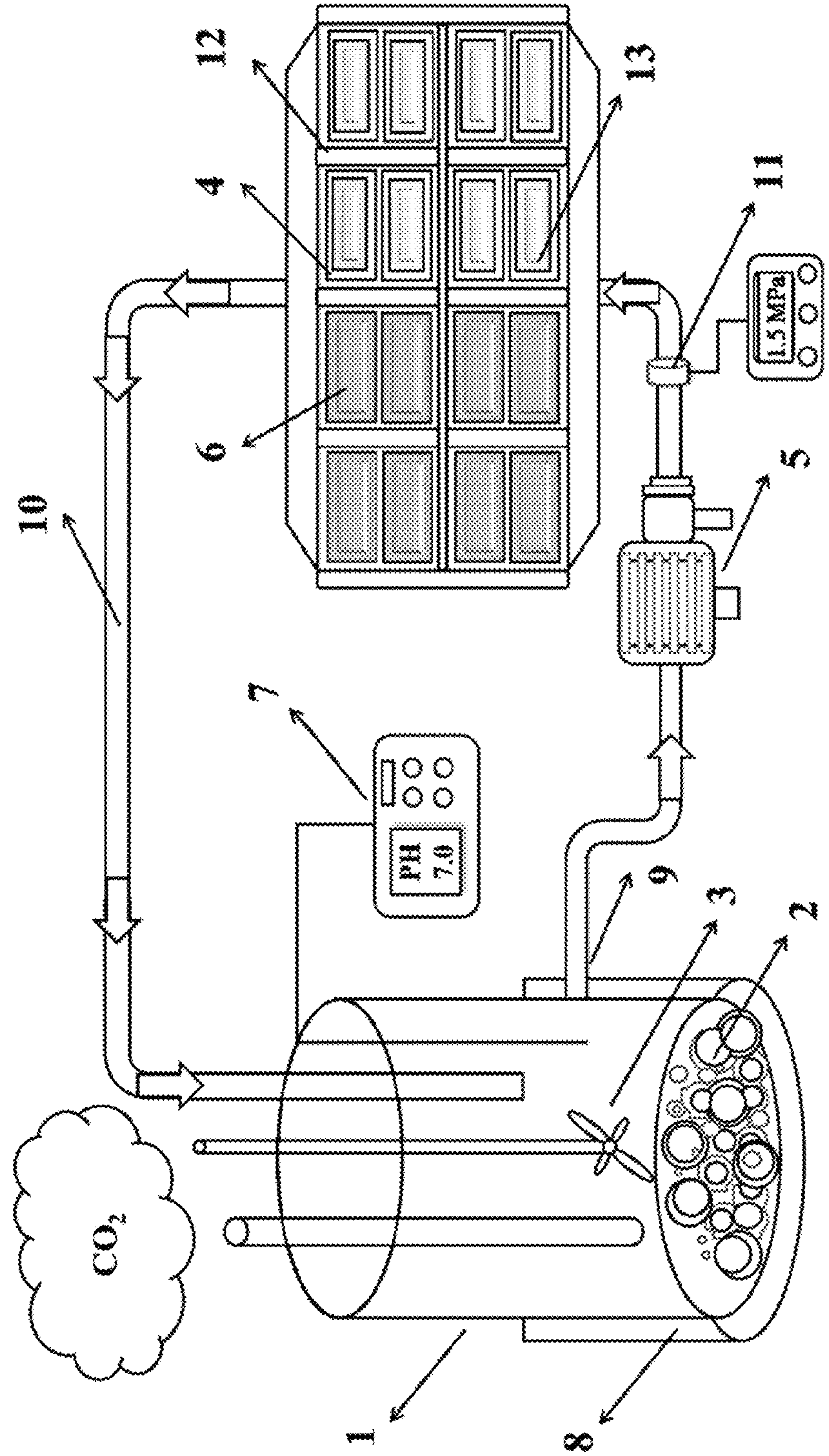
FIG. 2 is a schematic diagram illustrating a process of preparing a carbonized brick of recycled concrete powders.

As shown in FIG. 1 and FIG. 2, a preparation method of a carbonized brick of recycled concrete powders, including the following steps:

(1) weighing a composition A with a certain mass and adding the composition A into a liquid storage tank 1 with deionized water as a source of calcium ions, where the composition A is industrial solid waste materials 2;

(2) introducing one or more gases of a composition B into the liquid storage tank 1, controlling a gas flow rate to be 0.30 liter per minute (L/min), starting a stirring device configured with a stirring rod 3 as shown in FIG. 2, where a stirring speed is 700 revolutions per minute (r/min); reacting with a solid waste solution to generate a calcium bicarbonate solution, keeping a temperature of the liquid storage tank at 4 degrees Celsius (° C.), where the calcium ions are highly soluble and favorable for calcite formation under this temperature, and solid waste materials are basically hydrolyzed when a pH value in the liquid storage tank 1 is reduced to 6.0-6.3 and kept constant, with storage of carbon dioxide reaching saturation; then, temporarily stopping introducing gases, replacing a new composition A in the liquid storage tank; among them, the composition B is a source of hydrogen carbonate, including air or industrial waste gas containing carbon dioxide;

(3) weighing a component C of recycled powders 13, and filling into a molding die 4, connecting the molding die 4 with the liquid storage tank 1 through a pipeline, where the pipeline is configured with a water pump 5 used for pumping the calcium bicarbonate solution from the liquid storage tank circularly into the molding die with a solution flowing rate of 1.0 meter per second (m/s)-3.0 m/s, since an appropriate flowing rate ensures that the calcium bicarbonate solution fed into the molding die is fully decomposed by heat and undergoes subsequent precipitation and crystallization reactions, while too fast a flowing rate may cause part of the calcium bicarbonate solution to flow out of the molding die before decomposition or precipitation occurs, resulting in lower conversion efficiency, and too slow a flowing rate may cause prolonged production and lowers the efficiency of carbonized brick preparation;

controlling a temperature of the molding die to be 50° C., heating to decompose the calcium bicarbonate solution to generate carbon dioxide, allowing the carbon dioxide generated to react with calcium ions leached by C—S—H gel in the recycled powders to produce calcium carbonate, followed by precipitating, crystallizing and cementing the recycled powders in the molding die together with the calcium carbonate produced by a decomposition of the calcium bicarbonate solution to develop strength;

(4) turning off the water pump and stopping pumping the calcium bicarbonate solution when a pressure at an inflow of the solution into the molding die 4 reaches 1.5 megapascal (MPa), obtaining the carbonized brick 6, where the recycled powders in the molding die are cemented and a strength is developed; and (5) after stopping feeding sodium bicarbonate solution, waiting for about 30 min to remove the molding die with no further curing, leaving to dry under natural conditions before putting into use. As the recycled powders and calcite particles are all closely packed, there is a solid mechanical occlusion between calcite particles, which enables the component C in the molding die to be quickly cemented together without pressing and molding.

The principle of the present application is as follows:

the principle of carbonation reaction involves a process of physical adsorption and diffusion, which is divided into four stages based on the gas-liquid-solid phase reaction theory, including: firstly, at room temperature and pressure, the calcium-based reactive material in industrial solid waste dissolves and hydrolyzes in aqueous medium, releasing hydroxide ions, causing the pH of the slurry to rise and the slurry obtains strong alkalinity and strong ability to capture and storage carbon dioxide; carbon dioxide dissolves in water to produce carbonic acid, which reacts rapidly with hydroxide ions and calcium ions in the slurry, resulting in the decreasing of pH in the slurry and generation of calcium carbonate precipitation; after that, the producing speed of hydroxide ions by hydrolysis of solid waste materials is basically equal to that of hydrogen ions ionized by bicarbonate, and the pH of slurry remains relatively stable; as the mineralization reaction continues, the producing speed of hydroxide ions by hydrolysis is gradually dropped below the producing speed of hydrogen ions by introducing carbon dioxide, and the pH of slurry gradually decreases to remain unchanged when the carbonation reaction is basically completed.

With the excess introduction of carbon dioxide, the slurry becomes weakly acidic and the calcium carbonate precipitate gradually decomposes into calcium bicarbonate, according to following reactions:

$$CaO + H_2O = Ca(OH)_2$$

-continued $$Ca(OH)_2 = Ca^{2+} + 2OH^-$$

$$CO_2 + H_2O \rightleftharpoons H_2CO_3$$

$$H_2CO_3 \rightleftharpoons H^+ + HCO_3^-$$

$$CO_2 + OH^- \rightleftharpoons HCO_3^-$$

$$HCO_3^- \rightleftharpoons CO_3^{2-} + H^+$$

$$Ca^{2+} + HCO_3^- = CaCO_3 + H^+$$

$$Ca^{2+} + CO_3^{2-} \xrightarrow{H_2O} CaCO_3$$

$$CaCO_3 + CO_2 + H_2O \rightleftharpoons Ca(HCO_3).$$

The calcium bicarbonate solution decomposes under temperature conditions of about 50° C. in the molding die, producing carbon dioxide and calcium carbonate precipitation. Under conditions of pH=5 to 8, calcium leaches from the unstable C—S—H gel structure in the recycled powders and reacts with the carbon dioxide produced by the decomposition of calcium bicarbonate to produce calcium carbonate precipitation. The precipitated calcium carbonate forms crystals (calcite) under warm and humid conditions. The crystals, mixed with recycled powders, grow and develop in the interstices thus filling the pores, cementing the recycled powders and constructing with each other to form a mesh structure, which eventually forms strength. The granular gradation of the recycled powders is determined based on the principle of compact accumulation, which can effectively improve the denseness of the slurry, as shown in FIG. 1.

Embodiment 2

The preparation method of the carbonized brick of recycled concrete powders of the present embodiment is different from the Embodiment 1 by including the composition A of any one or more combinations of calcium-containing industrial solid waste materials, including carbide slag, fly ash, steel slag, desulfurized gypsum, granulated blast furnace slag, tailings, coal gangue and the like.

Embodiment 3

The preparation method of the carbonized brick of recycled concrete powders of the present embodiment is different from the Embodiment 1 by including the recycled powders with main components of silicon dioxide, calcium hydroxide, calcium aluminosilicate, ettringite and the like.

The C—S—H gel accounts for about 70% of a total volume of the recycled powders after fully hydration, and the calcium hydroxide accounts for about 20% of the total volume.

Embodiment 4

The preparation method of the carbonized brick of recycled concrete powders of the present embodiment is different from the Embodiment 1 by including the liquid storage tank 1 connected with a pH monitor 7 and a temperature controller 8, where the temperature controller 8 is configured to maintain the liquid storage tank at a stable temperature, and the pH monitor 7 is configured to monitor the liquid storage tank in terms of pH value change so as to control a duration of introducing the carbon dioxide.

A liquid inlet main pipe 9 and a liquid outlet main pipe 10 are connected between the liquid storage tank 1 and the molding die 4, a water pump 5 is configured on the liquid inlet main pipe, and a pipeline pressure monitor 11 is arranged on the liquid inlet main pipe 9 near the molding die;

the molding die 4 is internally configured with a plurality of grids with a size same as that of the carbonized brick prepared, where the size includes 240 millimeters (mm)×115 mm×53 mm, 240 mm×115 mm×180 mm, 180 mm×180 mm×90 mm, etc. The recycled powders have a particle gradation that satisfies a most compact stacking state, forming a uniform and dense state after filling into the grids, and the recycled powders are not easy to float, so there is no need to prepare the recycled powders into a wet material to be loaded onto the molding die; and a heating pipe 12 is configured around each grid, and each grid is provided with a liquid inlet branch pipe and a liquid outlet branch pipe, a plurality of liquid inlet branch pipes are connected with the liquid inlet main pipe 9, and a plurality of liquid outlet branch pipes are connected with the liquid outlet main pipe 10. The water pump 5 pumps the calcium bicarbonate solution circulative into the molding die, and after entering the molding die, the calcium bicarbonate solution flows through each branch pipe and into each grid.

Embodiment 5

The preparation method of the carbonized brick of recycled concrete powders of the present embodiment is different from the Embodiment 1 by including the composition A consisted of calcium carbide slag, fly ash and steel slag, where the calcium carbide slag is 30 parts, the fly ash is 35 parts and the steel slag is 20 parts by mass;

the liquid storage tank includes 51 parts of water, and a ratio of water in the liquid storage tank to the composition A is water:composition A=0.6; and the composition C includes 30 parts of recycled powders.

The carbide slag includes: 79.68-84.90 wt % CaO, 1.56-3.28 wt % $SiO_2$, 2.20-2.29 wt % $Al_2O_3$, 0.19-0.73 wt % MgO and 8.80-16.37 wt % others.

The fly ash includes: 3.42-8.45 wt % CaO, 45.71-48.10 wt % $SiO_2$, 23.20-31.34 wt % $Al_2O_3$, 2.47-3.17 wt % $Na_2O$, 0.57-3.97 wt % MgO and 4.97-24.63 wt % others.

The steel slag includes: 40.61-43.15 wt % CaO, 12.12-15.28 wt % $SiO_2$, 4.72-5.31 wt % $Al_2O_3$, 6.95-7.02 wt % $Fe_2O_3$, 10.35-11.62 wt % FeO, 10.34-12.39 wt % MgO, 1.21-2.52 wt % MnO, and 2.71-13.7 wt % others.

Embodiment 6

The preparation method of the carbonized brick of recycled concrete powders of the present embodiment is different from the Embodiment 5 by including the composition A consisted of calcium carbide slag, fly ash and steel slag, where the calcium carbide slag is 33 parts, the fly ash is 30 parts and the steel slag is 20 parts by mass; and the liquid storage tank includes 51 parts of water, and a ratio of water in the liquid storage tank to the composition A is water:composition A=0.6; and the composition C includes 30 parts of recycled powders.

Embodiment 7

The preparation method of the carbonized brick of recycled concrete powders of the present embodiment is different from the Embodiment 5 by including the composition A consisted of calcium carbide slag, fly ash and desulfurized gypsum, where the calcium carbide slag is 30 parts, the fly ash is 30 parts and the desulfurized gypsum is 25 parts by mass; and the liquid storage tank includes 51 parts of water, and a ratio of water in the liquid storage tank to the composition A is water:composition A=0.6; and the composition C includes 30 parts of recycled powders.

Embodiment 8

According to the preparation method of the carbonized brick of recycled concrete powders as described in Embodiment 7, the carbonized brick prepared is tested according to GB/T 2452-2012 *Test Methods for Wall Bricks* in terms of compressive strength and water absorption, and on a basis of thermogravimetric test results of the carbonized brick, a carbon capture rate is calculated as a following formula, with results as shown in Table 1:

$$\eta_{co_2} = \frac{\frac{w(CO_2)}{1 - w(CO_2)} \times \frac{M_{Ca}}{M_{CO_2}}}{Q_{Ca}} \times 100\%,$$

in the formula, $w(CO_2)$ is a mass fraction of carbon dioxide in the carbonized brick, $M_{Ca}$ and $M_{CO_2}$ represent the molar masses of calcium and carbon dioxide, respectively, and $Q_{Ca}$ is a mass fraction of calcium in industrial solid waste materials before carbonation (solid waste material that has not participated in any reaction before being placed in the liquid storage tank).

TABLE 1

Compressive strength and carbon capture rate of carbonized brick

| S/N | Compressive strength (MPa) | Water absorption (%) | Carbon capture rate (%) |
|---|---|---|---|
| Embodiment 5 | 13.65 | 9.0 | 42.19 |
| Embodiment 6 | 15.17 | 6.0 | 57.77 |
| Embodiment 7 | 14.02 | 7.0 | 49.23 |

The recycled powders conform to a theory of most compact stacking, with minimum inter-particle voids, and the carbonized brick produced is more uniform and denser as a whole. Based on Andreasen's compact stacking theory, the particle gradation is evaluated, and a particle size distribution in the most compact stacking state is:

$$U(D) = 100\left(\frac{D}{D_1}\right)^n,$$

in the formula, U(D) is a volume fraction of particles with a particle size smaller than D, %; D is a particle size, micrometer (μm); $D_1$ is a particle size of a largest particle in a system, μm; n is a distribution index, taking as ⅓.

The particle size distribution of recycled powders under a most compact packing state is shown in Table 2, and when the recycled powders are in the most compact packing state when the particle gradation satisfies the following Table 2:

TABLE 2

Particle gradation of recycled powders in the most compact packing state of Andreasen distribution ($D_{max}$ = 31.6 μm)

| Particle size/μm | 0-2.4 | 2.4-2.9 | 2.9-4.5 | 4.5-10.1 | 10.1-20.9 | 20.9-31.6 |
|---|---|---|---|---|---|---|
| Volume/% | 42.35 | 2.76 | 7.11 | 16.15 | 18.76 | 12.87 |
| Accumulated volume/% | 42.35 | 45.11 | 52.22 | 68.37 | 87.13 | 100 |

The particle gradation of the composition C, i.e., the recycled powders, shall meet the most compact packing state as illustrated in Table 2, with contents of calcium oxide and silicon dioxide being 17.51-29.20 weight percentage (wt %), and 27.80-43.26 wt % respectively.

Embodiment 9

A carbonized brick of recycled concrete powders prepared by the preparation method illustrated in the Embodiment 7.

The above described represents the preferred embodiments of the present application, and it should be noted that for a person of ordinary skill in the art, various improvements and embellishments are available without departing from the principles described herein, and these improvements and embellishments shall also be considered as falling within the protection of the present application.

What is claimed is:

1. A preparation method of a carbonized brick of recycled concrete powders, comprising the following steps:

(1) weighing a composition A with a certain mass and adding the composition A into a liquid storage tank with deionized water as a source of calcium ions, wherein the composition A is industrial solid waste materials;

(2) introducing gases of a composition B into the liquid storage tank, controlling a gas flow rate to be 0.30-0.60 liter per minute, starting a stirring device, reacting with a solid waste solution to generate a calcium bicarbonate solution, keeping a temperature of the liquid storage tank at 4-8 degrees Celsius, wherein the calcium ions are soluble and favorable for calcite formation under 4-8 degrees Celsius, and solid waste materials are hydrolyzed when a pH value in the liquid storage tank is reduced to 6.0-6.3 and kept constant, with storage of carbon dioxide reaching saturation; then, stopping introducing the gases, and replacing a new composition A in the liquid storage tank, wherein the composition B is air or industrial waste gas containing carbon dioxide;

(3) weighing 30 parts of component C of recycled powders, and filling into a molding die, connecting the molding die with the liquid storage tank through a pipeline, wherein the pipeline is configured with a water pump used for pumping the calcium bicarbonate solution from the liquid storage tank circularly into the molding die with a solution flowing rate of 1.0 meter per second-3.0 meter per second, controlling a temperature of the molding die to be 45-55 degrees Celsius, heating to decompose the calcium bicarbonate solution to generate carbon dioxide, and the generated carbon dioxide reacts with calcium ions leached by calcium silicate hydrate (C—S—H) gel in the recycled powders to produce calcium carbonate, followed by precipitating, crystallizing and cementing the recycled powders in the molding die together with the calcium carbonate produced by a decomposition of the calcium bicarbonate solution to develop strength;

(4) turning off the water pump and stopping pumping the calcium bicarbonate solution when a pressure at an inflow of the solution into the molding die reaches 1.5 to 3 megapascal when the recycled powders in the molding die are cemented and a strength is developed; and (5) waiting for about 30 minutes to remove the molding die, and leaving to dry under natural conditions before putting into use;

wherein according to percentages of calcium, aluminum, magnesium and other elements in the composition A, a mass percentage of each component is determined with a calculation formula below:

$$y_{Ca} = \frac{xN}{0.045} + 0.516(M - x),$$

in the calculation formula, $y_{Ca}$ is a sum of calcium contents of all solid waste materials in the composition A, x is a mass of a solid waste material with a highest calcium content in the composition A, N represents a proportion of calcium in the solid waste material with the highest calcium content in the composition A, $_x$N/0.045 represents a calcium content in the solid waste material with the highest calcium content in the composition A, 0.045 is an empirical coefficient derived from the calcium content of solid waste material with the highest calcium content in the composition A, M is a total mass of all solid waste materials in the composition A, 0.516(M−x) is a sum of calcium contents of other solid waste materials in the composition A, and 0.516 is an empirical coefficient derived from the sum of calcium contents of other solid waste materials in the composition A;

after determining the mass of the solid waste material with the highest calcium content in the composition A according to the calculation formula, appropriate contents of silicon and magnesium elements are determined, and a mass of other solid waste materials is determined by formulae below:

$$y_{Si} = \frac{xN}{1.95} + Z(M - x)$$

$$y_{Mg} = \frac{xN}{10.14} + E(M - x)$$

in the formulae, $y_{Si}$ and $y_{Mg}$ represent contents of silicon and magnesium in all solid waste materials in the composition A respectively, Z is a proportion of silicon in the solid waste materials determined, E is a proportion of magnesium in the solid waste materials determined, xN/1.95 and xN/10.14 respectively represent contents of silicon and magnesium in the solid waste material with the highest calcium content in the composition A, with 1.95 and 10.14 being empirical coefficients respectively; Z(M−x) and E(M−x) respectively represent contents of silicon and magnesium in other solid waste materials; by adding $y_{Si}$ and $y_{Mg}$, a sum of contents of silicon and magnesium contained in all solid waste materials in the composition A is obtained;

the composition A comprises any one or more combinations of carbide slag, fly ash, steel slag, desulfurized gypsum, granulated blast furnace slag, tailings, and coal gangue;

the recycled powders comprise silicon dioxide, calcium hydroxide, calcium aluminosilicate, and ettringite; and a particle size distribution of the recycled powders in the closest packing state is:

$$U(D) = 100\left(\frac{D}{D_1}\right)^n,$$

wherein U(D) is a volume fraction of particles with a particle size smaller than D, %; D is a particle size in micrometer; $D_1$ is a particle size of a largest particle in a system in μm; and n is a distribution index, taking as ⅓.

2. The preparation method of a carbonized brick of recycled concrete powders according to claim 1, wherein the C—S—H gel accounts for 70% of a total volume of the recycled powders after fully hydration, and the calcium hydroxide accounts for 20% of the total volume.

3. The preparation method of a carbonized brick of recycled concrete powders according to claim 1, wherein the liquid storage tank is connected with a pH monitor and a temperature controller, the temperature controller is configured to maintain the liquid storage tank at a stable temperature, and the pH monitor is configured to monitor the liquid storage tank in terms of pH value change so as to control a duration of introducing the carbon dioxide.

4. The preparation method of a carbonized brick of recycled concrete powders according to claim 1, wherein the composition A comprises calcium carbide slag, fly ash and steel slag, and the calcium carbide slag is 30 parts, the fly ash is 35 parts and the steel slag is 20 parts by mass; and the liquid storage tank comprises 51 parts of water, and the composition C comprises 30 parts of the recycled powders.

5. The preparation method of a carbonized brick of recycled concrete powders according to claim 1, wherein the composition A comprises calcium carbide slag, fly ash and steel slag, and the calcium carbide slag is 33 parts, the fly ash is 30 parts and the steel slag is 20 parts by mass.

6. The preparation method of a carbonized brick of recycled concrete powders according to claim 1, wherein the composition A comprises calcium carbide slag, fly ash and desulfurized gypsum, and the calcium carbide slag is 30 parts, the fly ash is 30 parts and the desulfurized gypsum is 25 parts by mass.

7. The preparation method of a carbonized brick of recycled concrete powders according to claim 1, wherein a liquid inlet main pipe and a liquid outlet main pipe are connected between the liquid storage tank and the molding die, a water pump is configured on the liquid inlet main pipe, and a pipeline pressure monitor is arranged on the liquid inlet main pipe near the molding die;

the molding die is internally configured with a plurality of grids with a size same as a size of the carbonized brick prepared, and the recycled powders are in a particle gradation in line with a most compact stacking state, forming a uniform and dense state after filling into the grids; and a heating pipe is configured around each grid, and each grid is provided with a liquid inlet branch pipe and a liquid outlet branch pipe, a plurality of liquid inlet branch pipes are connected with the liquid inlet main pipe, and a plurality of liquid outlet branch pipes are connected with the liquid outlet main pipe.

8. A carbonized brick of recycled concrete powders prepared by the preparation method according to claim 7.

* * * * *